Dec. 31, 1940.　　　W. F. CHRISTEL　　　2,227,216
MEANS FOR DETERMINING TOUGHNESS
Filed July 16, 1937　　　2 Sheets-Sheet 2

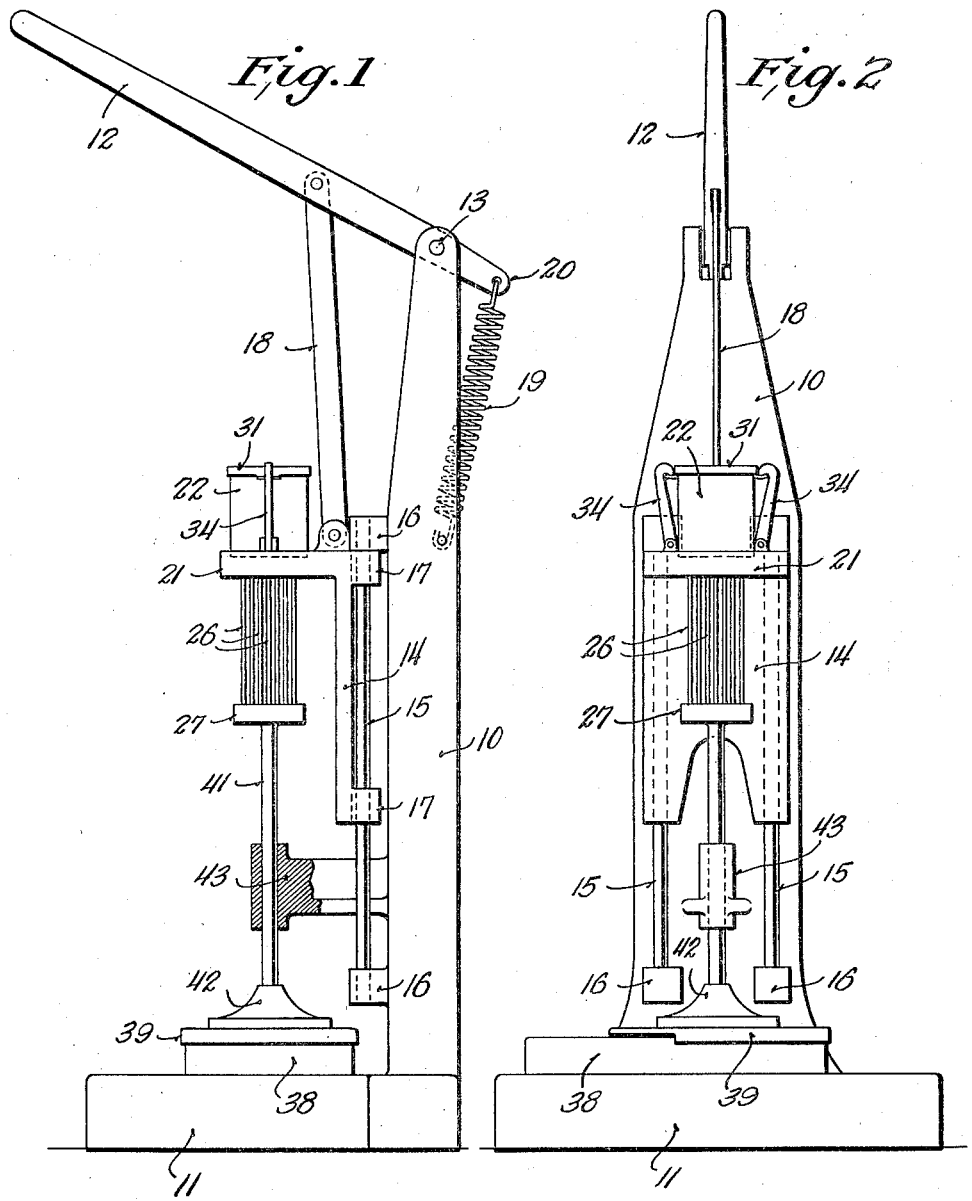

INVENTOR.
WILLIAM F. CHRISTEL
BY
ATTORNEY.

Patented Dec. 31, 1940

2,227,216

UNITED STATES PATENT OFFICE 2,227,216

MEANS FOR DETERMINING TOUGHNESS

William F. Christel, Valders, Wis., assignor to Canning Industry Research, Inc., Washington, D. C., a corporation of Delaware Application July 16, 1937, Serial No. 154,006

2 Claims. (Cl. 265—12)

This invention relates to the art of testing peas and other edible products for toughness and particularly to a novel means for the commercial testing of such produce.

An object of the present invention is to provide a simple, inexpensive machine which may be commercially utilized to effectively, reliably, and accurately test the toughness of peas and other edible products.

Other more specific objects and advantages will appear, expressed or implied, from the following description of an illustrative mechanical embodiment of the present invention.

In the accompanying drawings—

Figure 1 is a side elevation, partly in section, of a pea testing machine constructed in accordance with the present invention.

Fig. 2 is a front elevation thereof.

Figure 3:
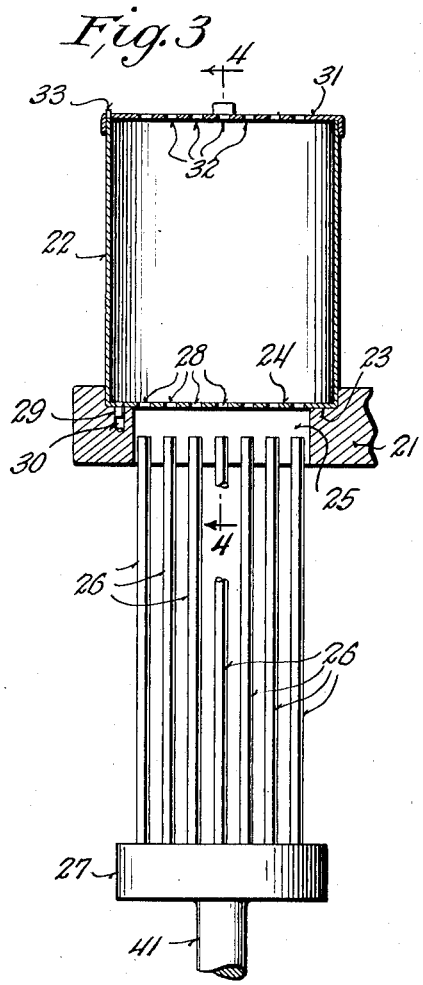
Fig. 3 is a view on a larger scale of the pea container and coacting gang punch, shown in Figs. 1 and 2, the container being shown in section and the punch in elevation.
Figure 4:
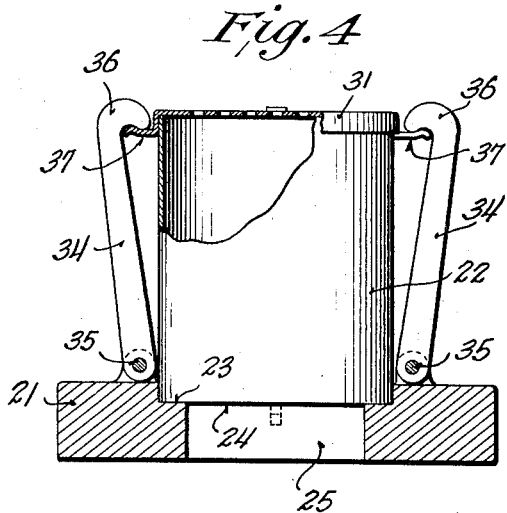
Fig. 4 is a view of the container and support, partly in elevation and partly in section, and taken substantially along the line 4—4 of Fig. 3.
Figure 5:
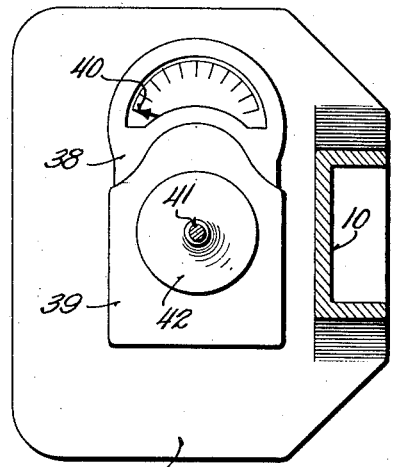
Fig. 5 is a horizontal section through the standard of the machine, looking downward at the base and supported weighing scale.
Figure 6:
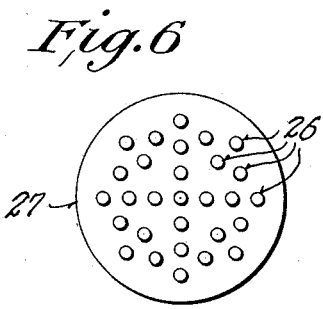
Fig. 6 is a top plan view of the gang punch.

The pea testing machine selected for illustration includes an appropriate standard 10, rising from an integral base 11, and carrying a suitable operating lever 12 rockably supported upon a conventional fulcrum pin 13 at the top of the standard.

The standard 10 also supports a carriage 14 guided for vertical reciprocation by and upon appropirate means, such as a pair of laterally spaced vertical guide rods 15, anchored in suitable lugs 16 which preferably project forwardly from the standard 10. In this instance the carriage is supported upon upper and lower pairs of bosses 17 bored to provide a close sliding fit with and upon the guide rods 15.

In the machine shown, the carriage 14 is vertically actuated and controlled by the lever 12 through appropriate linkage 18, and is preferably yieldably sustained in the upper position shown in Figs. 1 and 2 by suitable means, such as a tension spring 19 connected to the standard 10 and to the rear free end 20 of the lever.

The carriage 14 is equipped with a rigid support 21 for a suitable pea container 22, the support shown comprising a forwardly projecting heavy horizontal plate, having a circular recess 23 in its upper face to receive and center the circular bottom 24 of the container, and having an opening 25 therethrough to admit the multiplicity of punches 26 of a gang punch 27 therebelow.

Although the pea container 22 may assume various forms, the container shown comprises a substantially cylindrical metal can whose bottom contains a multiplicity of perforations 28 respectively disposed to register with and fit the several punches 26. Any suitable means, such as a lug 29 on the container engageable in a socket 30 in the carrier plate 21, may be employed to so position the container as to assure registration of the perforations 28 with the punches 26. The container is also preferably provided with a removable cover 31 having similar perforations 32 which register with and fit the punches 26, a projection 33 on the container coacting with a mating opening in the cover to assure accurate registration of the perforations 32 with perforations 28 and with the punches 26.

In the machine shown, the cover 31 is releasably fixed to the container 22 and the container releasably secured to the carrier plate 21 by suitable clamps 34, rockably connected at their lower ends 35 to the carrier plate and having hook-like formations 36 at their upper ends for clamping engagement over and upon appropriate ears 37 projecting from the cover.

For purposes to be later pointed out, the gang punch 27 is supported upon a weighing scale or other device capable of measuring and indicating the load or thrust imposed upon the punches during operation of the machine. In the machine shown, a weighing scale 38 of any standard or approved construction, having a weighing platform 39 and indicator 40, is employed, the scale being positioned on the base 11 of the machine with its platform 39 directly below the pea container 22; and the gang punch shown is provided with a supporting stem 41 and base 42 mounted on the platform 39 with the several punches 26 respectively aligned with the perforations in the bottom and cover of the container. A steadying bracket 43 projecting from the standard 10 and loosely engaging the stem 41 may be employed to assure and maintain the punches 26 in proper alignment.

To test a given supply of peas, properly selected specimens are placed in the container 22 to form a batch of sufficient volume to substantially fill the container; the filled container, with its cover, is then seated and positioned in the recess of the carrier plate 21 and fixed by the clamps 34; and thereafter the carrier plate and container are forced down over the punches 26 by actuation of the lever 12. During this downward movement of the container 22, the punches 26, sustained by the scale platform 39, enter through the perforations 28 of the container, pass upwardly through the batch of peas confined therein and through the perforations 32 in the cover 31, thereby simultaneously piercing the batch.

Since the total load imposed on the punches 26 during this piercing operation is sustained by the scale platform 39, the scale indicator 40 of course gives a true indication of the actual total piercing force required to penetrate the confined batch, and repeated experiments have shown this to be an accurate and reliable measure of the toughness of the peas.

For most accurate results, the diameters of the individual punches 26, as well as the spacing of the punches, is preferably less than the diameter of the peas acted upon. Due to this arrangement and size of the punches, and to the fact that the batch of peas is confined, the individual peas cannot escape the path of the punches, but are variously engaged and pierced by the punches, and the total resistance offered by the peas to the passage of the punches is truly proportional to the forces involved in chewing or masticating the peas and therefore a true measure of their toughness.

Various changes may be made in the embodiment of the invention hereinabove described without departing from or sacrificing the advantages of the invention as defined in the appended claims.

I claim:

1. A device for testing the toughness of peas and the like comprising a container for a batch thereof, said container having opposed walls provided with aligned perforations, a plurality of punches projectable through said walls to penetrate the batch therebetween at a plurality of points, and means for measuring the total penetrating force.

2. A device for testing the toughness of peas and the like comprising a container for a batch thereof, a vertically moveable carrier therefor, a plurality of vertical punches disposed below said carrier, means for actuating said carrier to effect projection of said punches through said container, and means for measuring the load imposed on said punches.

WM. F. CHRISTEL.